US008388050B2

(12) United States Patent
Katsura

(10) Patent No.: US 8,388,050 B2
(45) Date of Patent: Mar. 5, 2013

(54) ROOF APPARATUS FOR VEHICLE

(75) Inventor: Shintaro Katsura, Kariya (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 13/200,351

(22) Filed: Sep. 23, 2011

(65) Prior Publication Data

US 2012/0074736 A1 Mar. 29, 2012

(30) Foreign Application Priority Data

Sep. 29, 2010 (JP) ................................ 2010-218649

(51) Int. Cl.
*B60J 7/047* (2006.01)
*B60J 7/185* (2006.01)

(52) U.S. Cl. .................... 296/216.03; 296/222; 296/224

(58) Field of Classification Search ...................... 296/216.02–216.05, 222, 224
See application file for complete search history.

(56) References Cited

U.S. PATENT DOCUMENTS 5,405,185 A * 4/1995 Cheron et al. ................ 296/223
5,447,355 A * 9/1995 Kelm ............................ 296/223
6,290,289 B1 9/2001 Ohtsu et al.
7,144,077 B2 * 12/2006 Grimm et al. ................ 296/223
2009/0072588 A1 3/2009 Nakamura

FOREIGN PATENT DOCUMENTS

DE 100 24 829 5/2001
JP 7-81426 3/1995
JP 7-205661 8/1995

OTHER PUBLICATIONS

U.S. Appl. No. 13/137,179, filed Jul. 26, 2011.
Extended European Search Report for EP Appl. No. 11182022.1 dated Jan. 30, 2012.

* cited by examiner

*Primary Examiner* — Dennis Pedder
(74) *Attorney, Agent, or Firm* — Finnegan, Henderson, Farabow, Garrett & Dunner, LLP

(57) ABSTRACT

A roof apparatus includes an engaging groove being in communication with an inside of a guide rail at a rear portion, an engaging projection provided at a check member for stopping movement of the check member in a rearward direction of the vehicle by fitting into the groove and for canceling the stopping of the movement by being disengaged from the groove and entering into the guide rail, a cam recessed portion provided at the check member for maintaining the fitting state of the projection relative to the groove until a movable panel starts sliding by inserting a guide pin provided at a driving shoe thereto and for rotating the check member to disengage the projection from the groove when the panel starts sliding, and a restriction portion supporting the check member for restricting the disengagement of the projection from the groove during a tilting operation of the panel.

10 Claims, 5 Drawing Sheets

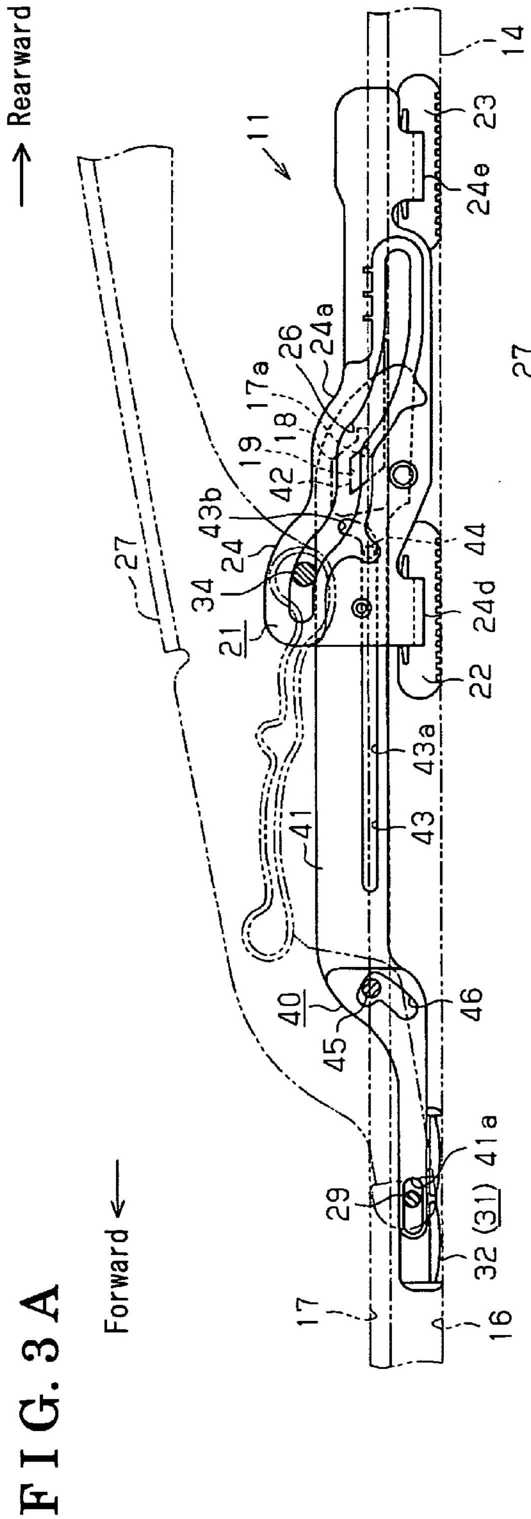
F I G. 3 A
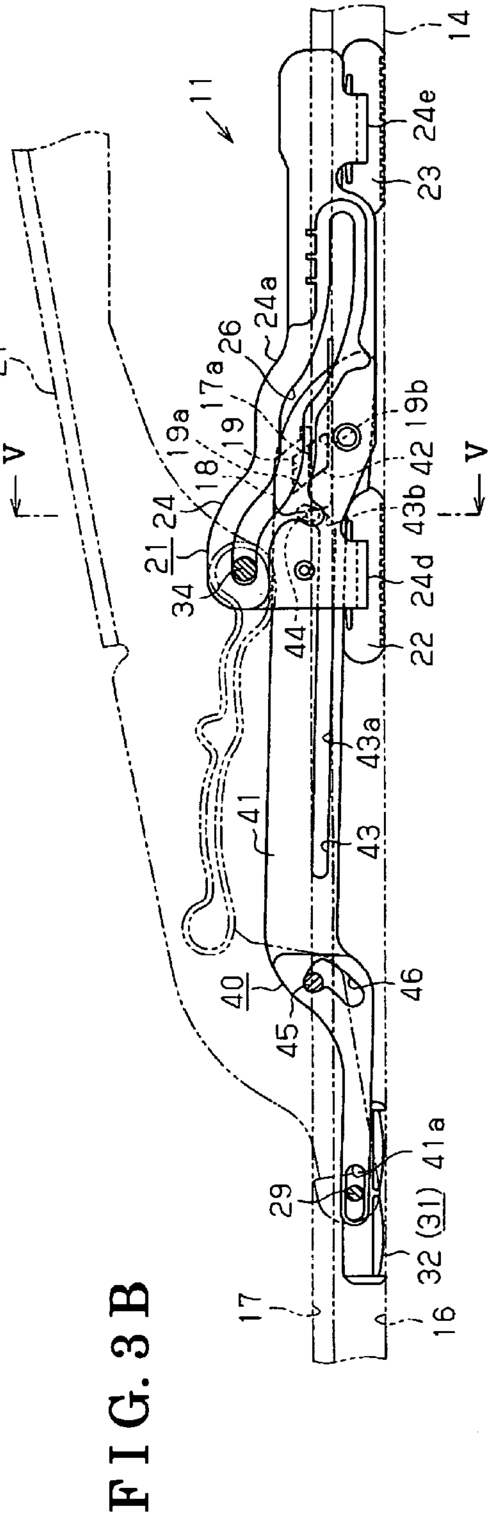
F I G. 3 B

F I G. 6
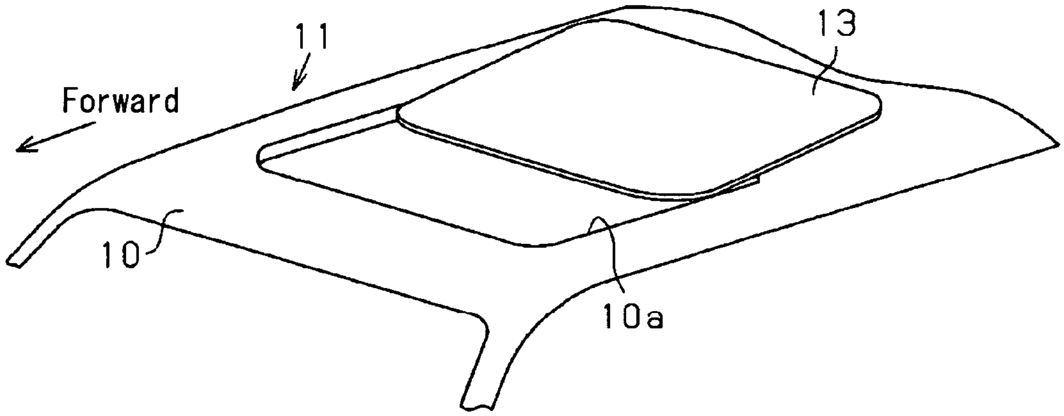

ROOF APPARATUS FOR VEHICLE

CROSS REFERENCE TO RELATED APPLICATIONS

This application is based on and claims priority under 35 U.S.C. §119 to Japanese Patent Application 2010-218649, filed on Sep. 29, 2010, the entire content of which is incorporated herein by reference.

TECHNICAL FIELD

This disclosure relates to a roof apparatus for a vehicle.

BACKGROUND DISCUSSION

A known roof apparatus for a vehicle is disclosed in JPH07-205661A (hereinafter referred to as Patent reference 1). The roof apparatus disclosed in the Patent reference 1 includes a guide rail provided at a side edge of an opening portion, a drive shoe slidably mounted within a guide groove of the guide rail and rotatably supporting a lift link, and a driven shoe slidably mounted within the guide groove and rotatably supporting a support link. A guide pin of the lift link is inserted into a cam groove formed on the support link so that the lift link and the support link, structuring a link mechanism together, interope rate each other to support a movable panel.

A check member which is rotatably supported by the driven shoe and is interoperated with the drive shoe via a cam mechanism is disposed within the guide groove. A connection pin, which is provided at the drive shoe and connects the drive shoe and the lift link, is inserted into a cam recessed portion formed on the check member so that the check member interoperates with the drive shoe.

Further, the check member integrally includes a contact portion, which is configured to contact a stopper provided at the guide rail, and a detachable portion which is configured to attach to and detach from a recessed hole formed on the guide rail. The check member is arranged so that the detachable portion faces the recessed hole in a state where the contact portion and the stopper contacts each other, and the detachable portion is attachable and detachable relative to the recessed hole by a rotation of the check member relative to the driven shoe about a pin. For example, when the connection pin of the drive shoe is positioned at a horizontally configured portion of the cam recessed portion, an engagement of the detachable portion and the recessed hole is maintained so that a sliding movement of the driven shoe together with the check member along the guide groove is stopped. On the other hand, when the connection pin of the drive shoe is positioned at the cam configured portion of the cam recessed portion, the engagement of the detachable portion and the recessed hole is canceled so that the driven shoe enables to slide along the guide groove together with the check member.

In a state where the movable panel is fully closed, the contact portion and the stopper contact each other and the detachable portion and the recessed hole engage each other. Then, when the drive shoe slides in a rearward direction of a vehicle along the guide groove in this state, the lift link rotates so as to recline relative to the guide rail in response to an action of the cam groove and the guide pin. In those circumstances, because the connection pin of the drive shoe moves only within the horizontally configured portion of the cam recessed portion, the drive shoe cannot slide along the guide groove. Thus, the movable panel slides downwardly in response to the reclining rotation of the lift link to establish a sliding attitude.

After the movable panel approximately establishes the sliding attitude, the connection pin of the drive shoe starts moving within the cam configured portion of the cam recessed portion, and thus the driven shoe is slidable along the guide groove together with the check member in a manner mentioned above. Then, when the connection pin of the drive shoe reaches a rear end of the cam configured portion of the cam recessed portion, a driving force of the drive shoe is transmitted to the driven shoe via the check member, and thus the driven shoe slides in the rearward direction of the vehicle along the guide groove together with the check member and the drive shoe. Accordingly, the movable panel slides while maintaining the sliding attitude to establish an open state.

According to the roof apparatus for the vehicle disclosed in the Patent reference 1, the check member extends in a front-rear direction of the vehicle, the contact portion of the check member and the stopper contact each other in the vicinity of a front end portion of the opening portion, and the engagement of the detachable portion and the recessed hole is maintained in the vicinity of a rear end portion of the opening portion. Further, a height of the check member is determined to be smaller than a height of the guide groove in order to allow a rotation of the check member in an upward-downward direction of a vehicle within the guide groove. Thus, there is a possibility that the detachable portion is disengaged from the recessed hole because of a generation of a flexure at the check member which displaces the detachable portion in the downward direction. Particularly, in a case where the check member is made from a material which is likely to flex, for example, a resin member, possibilities that the detachable portion is disengaged from the recessed hole further increase. When the detachable portion is disengaged from the recessed hole at an undesired position, a tilting movement of the movable panel from the closed state is assumed to be unstable, which may decrease reliability of the roof apparatus for the vehicle.

A need thus exists for a roof apparatus for a vehicle which is not susceptible to the drawback mentioned above.

SUMMARY

In light of the foregoing, the discourse provides a roof apparatus for a vehicle, which includes a driving shoe provided at an edge portion in a vehicle width direction of an opening portion formed on a roof portion of the vehicle to be movable in a front-rear direction of the vehicle along a guide rail, a driven shoe provided movably in the front-rear direction of the vehicle along the guide rail, a support member rotatably connected to the driven shoe and interoperating with the driving shoe for supporting a movable panel opening and closing the opening portion, an engaging groove provided at the guide rail and being in communication with an inside of the guide rail at a rear portion of the guide rail relative to the vehicle, a check member rotatably connected to the driven shoe, an engaging projection provided at the check member for stopping a movement of the check member in the rearward direction of the vehicle along the guide rail by fitting into the engaging groove and for canceling the stopping of the movement of the check member in the rearward direction of the vehicle along the guide rail by being disengaged from the engaging groove and entering into the guide rail, a cam recessed portion provided at the check member for maintaining the fitting state of the engaging projection relative to the engaging groove until the movable panel starts sliding by inserting a guide pin provided at the driving shoe thereto and for rotating the check member to disengage the engaging projection from the engaging groove when the movable panel starts sliding, and a restriction portion provided at the driving shoe and supporting the check member for restricting the disengagement of the engaging projection from the engaging groove during a tilting operation of the movable panel from a closed state. The movable panel is tilted from the closed state in response to a movement of the driving shoe in the rearward direction of the vehicle, and a sliding operation is performed consecutively.

BRIEF DESCRIPTION OF THE DRAWINGS

The foregoing and additional features and characteristics of this disclosure will become more apparent from the following detailed description considered with the reference to the accompanying drawings, wherein:

FIG. 3A is a cross-sectional view showing an operation of the roof apparatus for the vehicle according to the embodiment disclosed here;

FIG. 3B is a cross-sectional view showing the operation of the roof apparatus for the vehicle according to the embodiment disclosed here;

FIG. 6 is a perspective view of a roof according to the embodiment disclosed here.

DETAILED DESCRIPTION

One embodiment of a roof apparatus for a vehicle will be explained with reference to illustrations of drawing figures as follows. As shown in FIG. 6, a roof 10 for a vehicle, for example for an automobile, is formed with a roof opening portion 10*a* formed in an approximately rectangular shape. Further, a sunroof apparatus 11 includes a movable panel 13 which is formed in an approximately rectangular shape and made from, for example, a pane, for opening and closing the roof opening portion 10*a*.

The movable panel 13 is attached to the roof 10 so that a rear portion thereof moves upwardly by a pivotal movement about a front portion thereof (i.e., a tilt-up operation) and to be slidable in front-rear directions of the vehicle. An outer sliding type mechanism is applied for an opening-closing operation of the movable panel 13, in which the movable panel 13 slides maintaining a tilted state.

A structure of the sunroof apparatus 11 in connection with the opening-closing operation of the movable panel 13 will be explained as follows. The sunroof apparatus 11 is provided with structures for opening and closing the movable panel 13 at the both sides of the roof opening portion 10*a* in a vehicle width direction as a pair. Basically, the structure provided at one of the sides of the roof opening portion 10*a* in the vehicle width direction will be explained for an explanatory purpose. Hereinafter, directions, such as "front/rear", "up/down", or the like, correspond to an orientation of the vehicle.

Figure 1A:
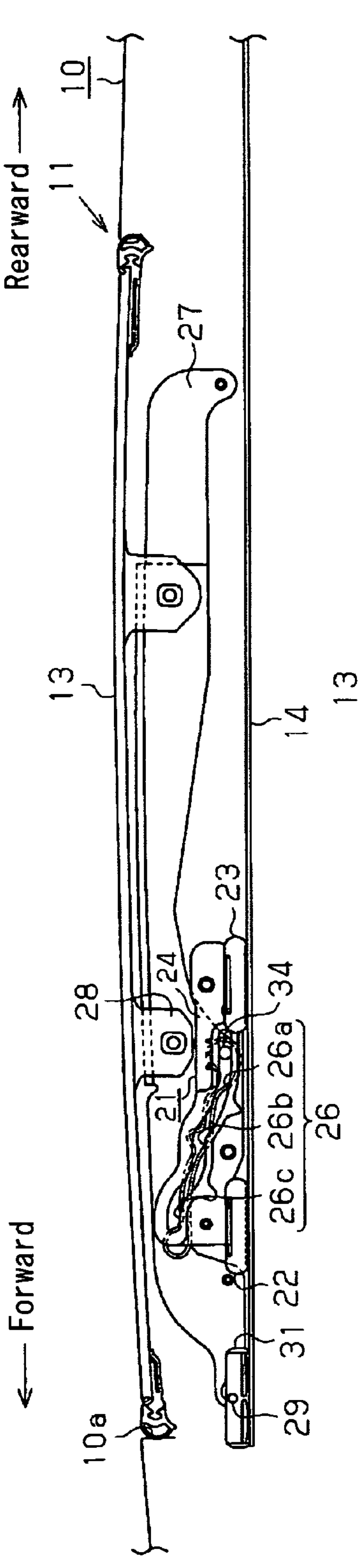
FIG. 1A is a side view of a roof apparatus for a vehicle when a movable panel is fully closed according to an embodiment disclosed here.
Figure 1B:
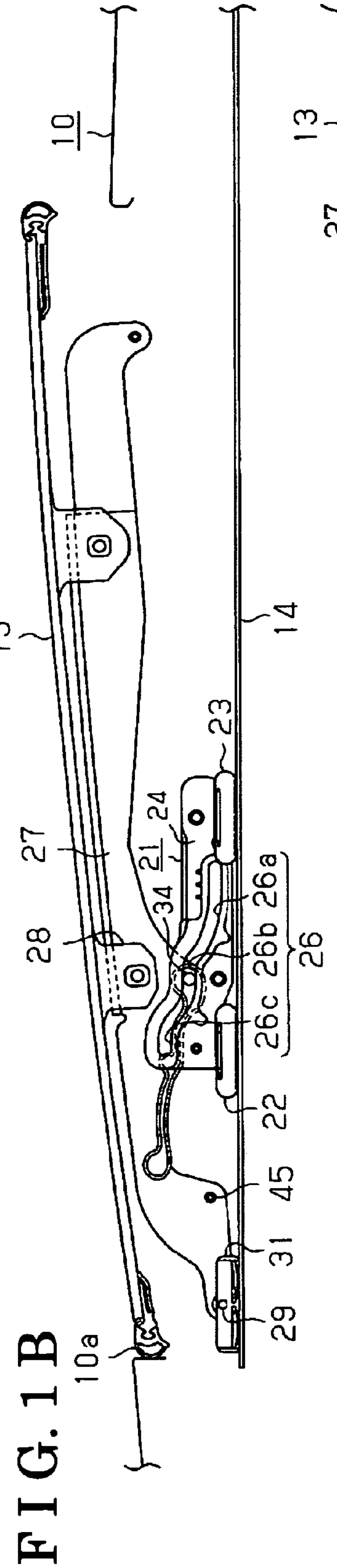
FIG. 1B is a side view of the roof apparatus for the vehicle during a tilt-up operation according to the embodiment disclosed here.
Figure 1C:
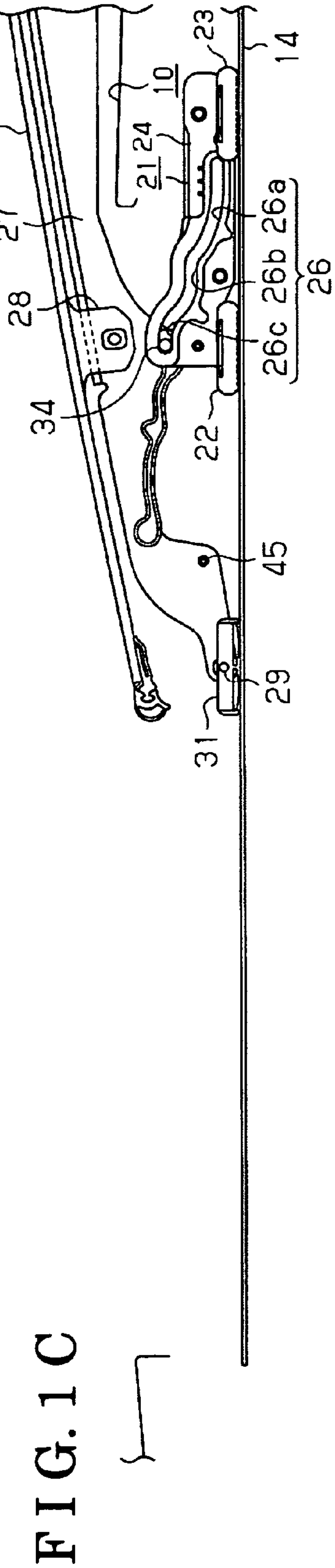
FIG. 1C is a side view of the roof apparatus for the vehicle when the movable panel is fully open according to the embodiment disclosed here.
Figure 4:
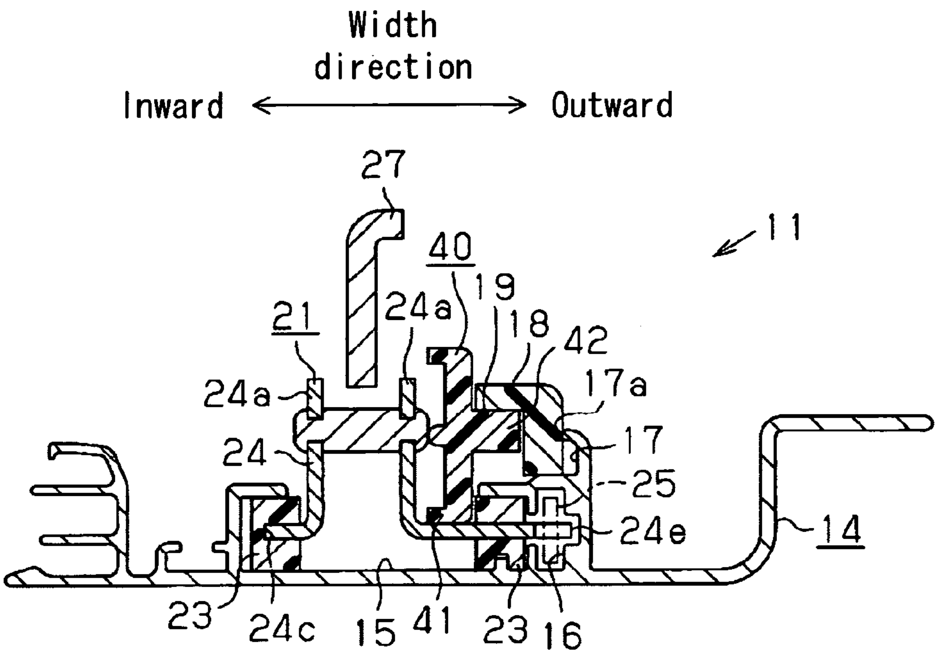
FIG. 4 is a cross-sectional view taken on line IV-IV shown in FIG. 2 of the roof apparatus for the vehicle according to the embodiment disclosed here.
Figure 5:
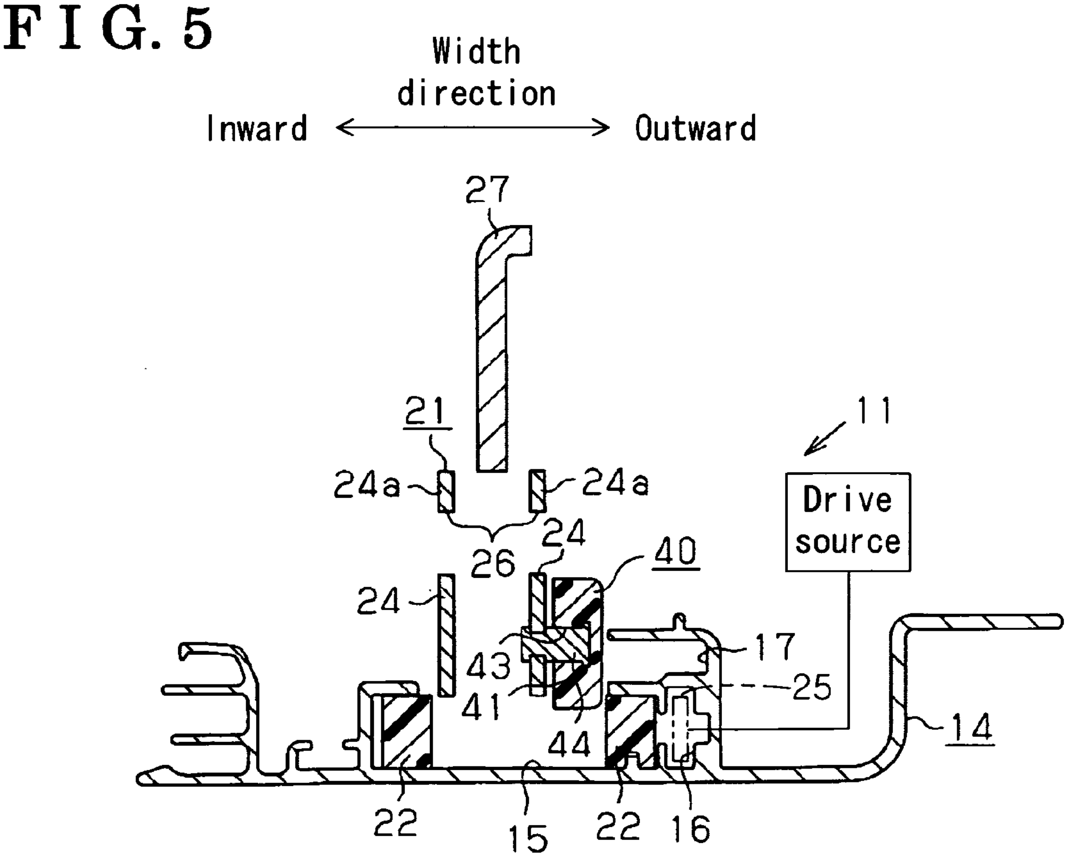
FIG. 5 is a cross-sectional view taken on line V-V shown in FIG. 3 of the roof apparatus for the vehicle according to the embodiment disclosed here.

As shown in FIGS. 1A-1C, the sunroof apparatus 11 includes a guide rail 14 provided at an edge portion of the roof opening portion 10*a* in the vehicle width direction to extend in a front-rear direction of the vehicle. The guide rail 14 is, for example, made from an extrusion member of aluminum alloy. As illustrated in FIGS. 4 and 5, the guide rail 14 is formed with a first rail portion 15 having a cross-section formed approximately in a C-shape which opens in an upward direction of the vehicle.

Further, the guide rail 14 is formed with a second rail portion 16 adjacent to the first rail portion 15 at an outer side thereof in a vehicle width direction. A clearance defined by the second rail portion 16 and a sidewall of the first rail portion 15 forms an approximately T-shape in a cross-section. The second rail portion 16 is in communication with the first rail portion 15 via an opening formed on the sidewall of the first rail portion 15. Further, the guide rail 14 is provided with a third rail portion 17 at a position which is outward of the first rail portion 15 in the vehicle width direction and upward of the second rail portion 16. The third rail portion 17, an upper wall portion of the first rail portion 15, and an upper wall portion of the second rail portion 16 form an approximately U-shaped cross-section whose opening portions faces inward in the vehicle width direction. The third rail portion 17 includes a cut-away portion 17*a* (see FIG. 2B) which is formed on an upper wall of the third rail portion 17 at a predetermined position in the front-rear direction of the vehicle.

A guide block 18, for example, made from a resin member is fitted to the cut-away portion 17*a* of the third rail portion 17 thus to be fixed to the guide rail 14. An engaging groove 19, which is in communication with an inside of the third rail portion 17 at a rear portion of the vehicle, is formed on the guide block 18. That is, the engaging groove 19 includes a pair of inclination surfaces 19*a*, 19*b* which are formed in parallel to each other and are inclined downwardly in a vehicle rearward direction, and an engaging surface 19*c* which is formed on the third rail portion 17 at an upper side to be in parallel to an upper wall of the third rail portion 17 for connecting upper ends of the inclination surfaces 19*a*, 19*b*. The engaging groove 19 is in communication with the inside of the third rail portion 17 at the downward position of the inclination surfaces 19*a*, 19*b*.

Figure 2A:
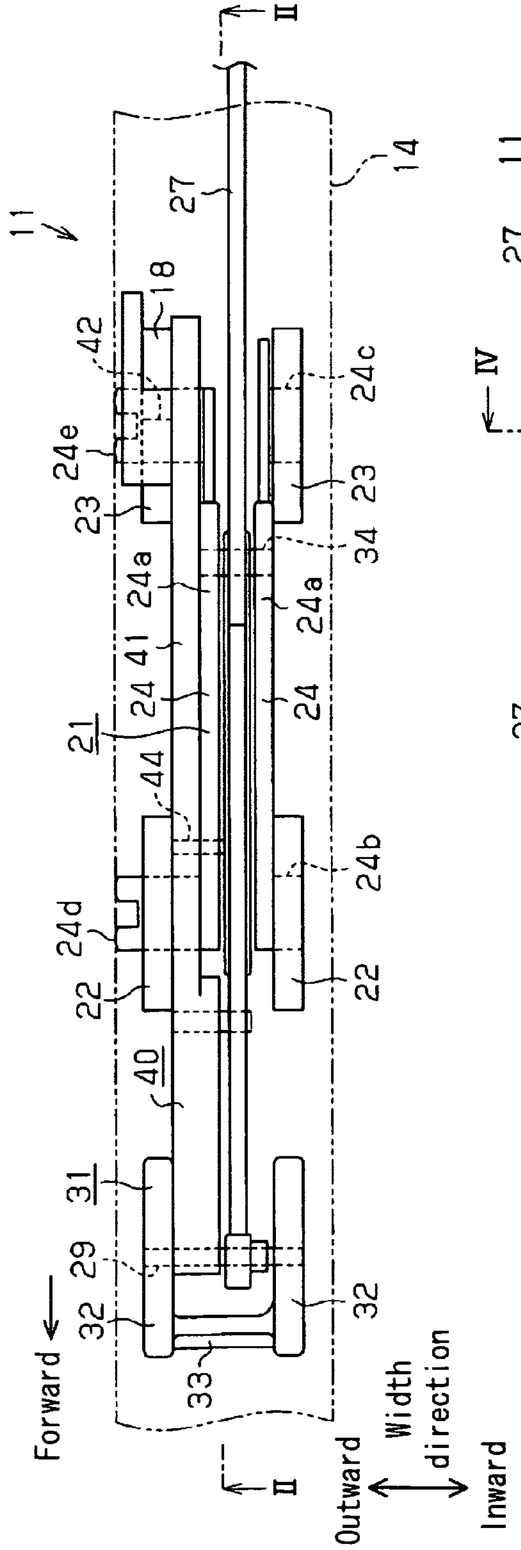
FIG. 2A is a plan view of the roof apparatus for the vehicle according to the embodiment disclosed here.
Figure 2B:
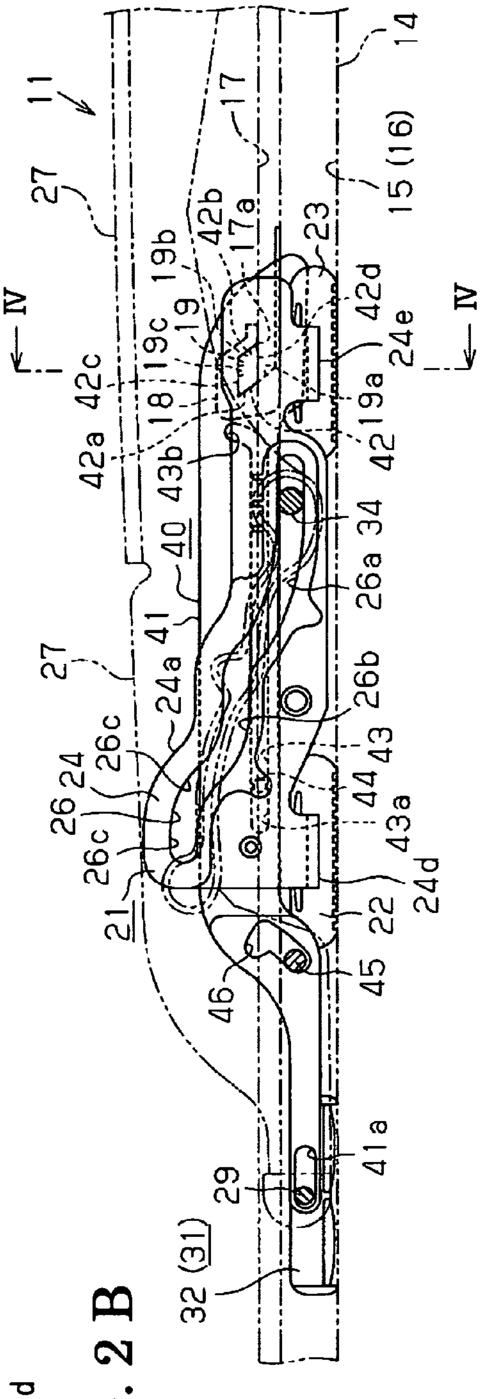
FIG. 2B is a cross-sectional view taken on line II-II shown in FIG. 2A of the roof apparatus for the vehicle according to the embodiment disclosed here.

A driving shoe 21 is provided at the first rail portion 15 of the guide rail 14 to be movable in the front-rear direction of the vehicle. That is, as shown in FIGS. 2A-2B, the driving shoe 21 includes shoe portions 22, 23, and main body portions 24. The shoe portion 22 and the shoe portion 23 positioned forward and rearward relative to each other serves as a pair and are configured to slide in the vehicle width direction at one side of the first rail portion 15. A pair of the shoe portions 22, 23 and the main body portion 24 which is connected to the shoe portions 22, 23 serve as a set, and the driving shoe 21 includes two sets of the shoe portions 22, 23 and the main body portion 24. The two sets of the shoe portions 22, 23 and the main body portion 24 are arranged facing in opposite directions so that the main body portions 24 face each other and connect to one another. One of the main body portions (the first main body portion) 24 positioned at an inner side of the first rail portion 15 in the vehicle width direction includes a first wall portion 24*a* formed in a plate shape and provided in an upright manner above a center portion of the first rail portion 15 in the vehicle width direction, and a pair of extending pieces 24*b*, 24*c* which are arranged at front and rear portions of the first main body portion 24, respectively, and extended from a bottom end of the first wall portion 24*a* inwardly in the vehicle width direction. The extending pieces 24*b*, 24*c* are inserted into the shoe portions 22, 23, respectively, to fix the first main body portion 24 to the shoe portions 22, 23. The other of the main body portions (the second main body portion) 24 positioned in the vehicle width direction at an outer side of the first rail portion 15 includes the first wall portion 24*a* formed in a plate shape and provided in an upright manner above a center portion of the first rail portion 15 in the vehicle width direction, and a pair of extending pieces 24*d*, 24*e* which are arranged at front and rear portions of the second main body portion 24, respectively, and extended from the bottom end of the first wall portion 24*a* outwardly in the vehicle width direction. The extending pieces 24*d*, 24*e* are inserted into the shoe portions 22, 23, respectively, to fix the second main body portion 24 to the shoe portions 22, 23.

End portions of the extending pieces 24*d*, 24*e* arranged penetrating through the shoe portions 22, 23 are positioned within the second rail portion 16 through the first rail portion 15 and are inserted to fit to a driving belt 25 serving as a transmission member (see FIG. 4) which slides on the second rail portion 16 in the front-rear direction of the vehicle. The driving belt 25 is connected to a drive source, for example, an electric motor and is driven by the drive source to move in the front-rear direction of the vehicle along the guide rail 14 (the second rail portion 16). Thus, the driving shoe 21 is actuated to move in the front-rear direction of the vehicle along the guide rail 14 (the first rail portion 15).

Each of the first wall portions 24*a* (the main body portions 24) is formed with a guide groove 26 opening in the vehicle width direction and extending in the front-rear direction of the vehicle. The guide groove 26 includes a first inclined portion 26*a* which inclines upwardly towards the forward of the vehicle, a linear portion 26*b* formed continuously from a front end of the first inclined portion 26*a* to extend approximately in parallel to the guide rail 14, and a second inclined portion 26*c* which is formed continuously from a front end of the linear portion 26*b* to incline upwardly towards the forward of the vehicle.

On the other hand, as shown in FIG. 1, a support panel 28 made from, for example, a metal plate is secured to a bottom surface of the movable panel 13 at edge portions, in the vehicle width direction, positioned above the guide rail 14. A support bracket 27 serving as a support member made from a metal plate which extends in the front-rear direction of the vehicle is fastened to the support panel 28. The support bracket 27 extends over an entire length of the movable panel 13. A front end of the support bracket 27 is rotatably connected to a driven shoe 31 by means of a connection pin 29 axially extended in the vehicle width direction. The driven shoe 31 is provided forward of the driving shoe 21 to be movable in the front-rear direction relative to the first rail portion 15 of the guide rail 14. That is, as shown in FIG. 2A, the driven shoe 31 includes a pair of shoe portions 32 arranged at the end portions of the first rail portion 15 in the vehicle width direction, respectively, to slide thereon and a connecting portion 33 connecting front ends of the shoe portions 32. Each of the shoe portions 32 pivotally supports an end portion of the connection pin 29 arranged penetrating through the support bracket 27. A rear portion of the movable panel 13 supported by the support bracket 27 moves upwardly and downwardly by rotating about the front end of the support bracket 27 (the connection pin 29) serving as a pivot.

A first guide pin 34, which is formed approximately in a cylindrical shape, is secured to a front end portion of the support bracket 27. The first guide pin 34 protrudes in the vehicle width direction to be movably fitted into the guide grooves 26. In other words, the both ends of the first guide pin 34 are supported by the guide grooves 26 of the driving shoes 21, and the support bracket 27 is positioned between the first wall portions 24*a*. According to the foregoing construction, the support bracket 27 is avoided from interfering with the driving shoes 21 (first wall portions 24*a*) by positioning and moving the support bracket 27 between the first wall portions 24*a* during the rotation of the support bracket 27. Thus, the support bracket 27 is arranged to overlap with a height range of the driving shoe 21 particularly at the fully closed state of the movable panel 13, and thus the roof apparatus for the vehicle is downsized in a vehicle height direction (see FIG. 2B).

As shown in FIG. 1A, the first guide pin 34 is arranged to be positioned at a bottom end of the guide groove 26 (the first inclined portion 26*a*) when the movable panel 13 is fully closed. Thus, when the driving shoe 21 moves in the front-rear direction of the vehicle along the guide rail 14 (the first rail portion 15) in this state, the first guide pin 34 guided by the guide groove 26 moves on the first inclined portion 26*a* upwardly to reach the linear portion 26*b*. In those circumstances, by pivoting the movable panel 13 about the front end of the support bracket 27 serving as the pivot in response to an upward movement of the support bracket 27 (first guide pin 34) relative to the driving shoe 21, as shown in FIG. 1B, the rear portion of the movable panel 13 moves upwardly to tilt.

Thereafter, when the driving shoe 21 further moves along the guide rail 14 (the first rail portion 15) in the rearward direction of the vehicle, the first guide pin 34 guided by the guide groove 26 moves on the second inclined portion 26*c* upwardly to reach an end thereof. In those circumstances, the movable panel 13 further rotates (pivots) about the front end of the support bracket 27 serving as the pivot to further move the rear portion of the movable panel 13 upwardly to tilt-up (i.e., a second tilted-up state), and slides in the rearward direction of the vehicle together with the driving shoe 21 while maintaining the tilted-up state. Accordingly, the movable panel 13 is assumed to be in a fully open state as illustrated in FIG. 10.

When the driving shoe 21 moves in a forward direction of the vehicle from the fully open state of the movable panel 13, the components of the roof apparatus are operated in a reversal direction from the above-explained operation.

As illustrated in FIGS. 2A and 2B, a check member 40, for example, made from a resin member is rotatably connected to the driven shoe 31 by means of the connection pin 29. That is, the check member 40 includes a main body wall portion 41 which is formed to be in an upright manner and extends in the front-rear direction of the vehicle between the shoe portions 22, 23 and one of the first wall portions 24*a* of the driving shoe 21 positioned at an outer side in the vehicle width direction. By an insertion of the connection pin 29 into a bearing hole (slot) 41*a* shaped in a long hole formed on a front end portion of the main body wall portion 41, the check member 40 is rotatably connected to the driven shoe 31. Further, the check member 40 includes an engaging projection 42 projecting outwardly in the vehicle width direction from a rear end portion of the main body wall portion 41. The engaging projection 42 includes a pair of guiding surfaces 42*a*, 42*b*, which are arranged in parallel to each other and are slidable with the inclination surfaces 19*a*, 19*b* of the engaging groove 19, respectively. The engaging projection 42 further includes an upper surface 42*c* and a bottom surface 42*d* which are arranged in parallel to each other and connect upper ends of the guiding surfaces 42*a*, 42*b* and bottom ends of the guiding surfaces 42*a*, 42*b*, thus the engaging projection 42 being formed in a parallelogramic pillar shape.

A movement of the check member 40 together with the driven shoe 31 in the rearward direction (front-rear directions) of the vehicle along the guide rail 14 is stopped by fitting the engaging projection 42 into the engaging groove 19 in a state where the upper surface 42*c* of the engaging projection 42 is in contact with the engaging surface 19*c* of the engaging groove 19. Further, the stopping of the movement of the check member 40 in the rearward direction (front-rear directions) of the vehicle along the guide rail 14 is canceled by a clockwise rotation of the check member 40 in FIG. 2B about the front end thereof (the connection pin 29) as the pivot so that the engaging projection 42 is disengaged from the engaging groove 19 to enter the third rail portion 17.

The check member 40 includes a cam slot (i.e., serving as a cam recessed portion) 43 opening in the vehicle width directions. The cam slot 43 includes a linear portion 43*a* formed in a long hole shape extending in the front-rear direction of the vehicle and an inclined portion 43*b* continuously formed from a rear end of the linear portion 43*a* and inclining upwardly towards the rear of the vehicle. On the other hand, one of the first wall portions 24*a* of the driving shoe 21 provided at the outer side in the vehicle width direction is provided with a second guide pin (i.e., serving as a guide pin) 44 which projects outwardly in the vehicle width direction to be inserted into the cam slot 43. That is, an attitude of the check member 40 is determined by restricting the position in the upward and downward direction by the connection pin 29 and the second guide pin 44.

When the second guide pin 44 slides on the linear portion 43*a* of the cam slot 43 in response to the movement of the driving shoe 21 in the front-rear direction of the vehicle, the check member 40 maintains a constant attitude without pivoting about the connection pin 29. In those circumstances, the engaging projection 42 is set to fit into the engaging groove 19. The rotation of the check member 40 about the connection pin 29 or a deformation of the check member 40 in a direction to disengage the engaging projection 42 from the engaging groove 19 is restricted by contacting or closely positioning a bottom surface of the rear end portion of the main body wall portion 41 to the extending piece (i.e., serving as a restriction portion) 24*e* of the driving shoe 21. A moving range of the second guide pin 44 along the linear portion 43*a* corresponds to a moving range of the driving shoe 21 when the movable panel 13 is moved from, for example, the fully closed state to be slidable in the tilted-up state via the tilt-up operation.

As shown in FIGS. 3A and 3B, when the second guide pin 44 reaches the rear end of the linear portion 43*a* of the cam slot 43 and enters the inclined portion 43*b* in response to the movement of the driving shoe 21 in the rearward direction of the vehicle, the check member 40 pushed by the second guide pin 44 at the inclined portion 43*b* rotates about the connection pin 29 in the clockwise direction in FIGS. 3A and 3B. In those circumstances, because the rear end portion of the main body wall portion 41 is positioned between the extending pieces 24*d*, 24*e* during the movement of the driving shoe 21 in the rearward direction of the vehicle, the rotation of the check member 40 is not restricted. Thus, the engaging projection 42 is guided by the inclination surfaces 19*a*, 19*b* of the engaging groove 19 to enter the third rail portion 17. Then, the check member 40 maintains a constant attitude without rotating about the connection pin 29 by the fitting engagement of the engaging projection 42 with the third rail portion 17. Accordingly, upon the further movement of the driving shoe 21 in the rearward direction of the vehicle in the foregoing state, the check member 40 which is engaged with the second guide pin 44 at the inclined portion 43*b* moves in the rearward direction of the vehicle together with the driven shoe 31 while sliding the engaging projection 42 in the third rail portion 17. Then, the movable panel 13 slides while maintaining the tilted-up state to establish the fully open state.

A third guide pin 45 projecting outward in the vehicle width direction at a rear of the connection pin 29 is provided at a front end portion of the support bracket 27. A guiding slot 46, which is formed approximately in an L-shape to accord to a relative moving locus of the third guide pin 45 when moving the movable panel 13 (from the fully closed state to the tilt-up operation, and then to the sliding operation) and to which the third guide pin 45 is inserted, is formed on the check member 40. In other words, positioning of the check member 40 relative to the support bracket 27 during the operation of the movable panel 13 is determined by the engagement of the third guide pin 45 and the guiding slot 46.

An operation of the roof apparatus for the vehicle according to the embodiment will be explained as follows. From the closed state of the movable panel 13 until the movable panel 13 starts sliding via the tilt-up operation, the fitting state of the engaging projection 42 relative to the engaging groove 19 is maintained by the cam slot 43 (linear portion 43*a*) to which the second guide pin 44 is inserted. Then, the movement of the check member 40 in the rearward direction of the vehicle together with the driven shoe 31 is stopped. Particularly, during the tilting-up operation of the movable panel 13, because the check member 40 is supported by the extending piece 24*e* of the driving shoe 21, a disengagement of the engaging projection 42 from the engaging groove 19 is securely restricted.

On the other hand, when the movable panel 13 starts sliding, the rotation of the check member 40 is guided by the cam slot (inclined portion 43*b*) to which the second guide pin 44 is inserted so that the engaging projection 42 is disengaged from the engaging groove 19. Further, the check member 40 is allowed to rotate in a clearance formed between the extending pieces 24*d*, 24*e*. Thus, the stopping of the movement of the check member 40 in the rearward direction of the vehicle together with the driven shoe 31 is canceled to allow the movable panel 13 be slidable. When the engaging projection 42 disengaged from the engaging groove 19 enters into the third rail portion 17, the rotation of the check member 40 is re-restricted by the third rail portion 17 as explained above. Accordingly, when the driving shoe 21 further moves in the rearward direction of the vehicle, the driven shoe 31 moves in the rearward direction via the check member 40 stopped by the guide pin 44 at the inclined portion 43*b* of the cam slot 43, and the support bracket 27 engaged with the second inclined portion 26*c* of the guide groove 26 moves in the rearward direction of the vehicle. Then, the movable panel 13 slides while maintaining the tilted-up state to establish the fully open state.

When the movable panel 13 is operated from the fully open state to close, the fitting state of the engaging projection 42 relative to the third rail portion 17 is maintained until the movable panel 13 completes the sliding operation. Accordingly, when the driving shoe 21 moves in the forward direction of the vehicle, the driven shoe 31 moves in the forward direction of the vehicle via the check member 40 which is stopped by the second guide pin 44 at the inclined portion 43*b* of the cam slot 43, the movable panel 13 slides while maintaining the tilted-up state. Then, when the sliding movement of the movable panel 13 is completed, the rotation of the check member 40 is guided by the cam slot 43 (inclined portion 43$b$) to which the second guide pin 44 is inserted so that the engaging projection 42 fits into the engaging groove 19. Thus, the movement of the check member 40 together with the driven shoe 31 in the forward direction of the vehicle is stopped so that the movable panel 13 is able to start the tilting-down operation. Accordingly, when the driving shoe 21 further moves in the forward direction of the vehicle, the guide grooves 26 guide the first guide pin 34 while sliding the second guide pin 44 on the linear portion 43$a$ of the cam slot 43, the movable panel 13 operates tilting-down to establish the fully closed state.

According to the embodiment as described above, the following affects and advantages are attained.

First, according to the embodiment, the disengagement of the engaging projection 42 from the engaging groove 19 is restricted during the tilting-up operation of the movable panel 13 by supporting the check member 40 (main body wall portion 41) by the extending piece 24$e$ of the driving shoe 21. Thus, the movement of the check member 40 (and the driven shoe 31) in the rearward direction of the vehicle along the guide rail 14 is further securely stopped, and the tilting-up operation of the movable panel 13 is stabilized. Particularly, the check member 40 is supported by the extending piece 24$e$ of the driving shoe 21 immediately after the start of the tilting-up operation of the movable panel 13 from the fully closed state, at which a load to stop the movement of the driven shoe 31 is maximized.

According to the construction of the embodiment, because the disengagement of the engaging projection 42 from the engaging groove 19 is restricted by means of the extending piece 24$e$ connecting the driving shoe 21 and the driving belt 25, the number of parts required is reduced.

According to the construction of the embodiment, when the movable panel 13 starts sliding, the rotation of the check member 40 in a direction by which the engaging projection 42 is disengaged from the engaging groove 19 is allowed in the clearance formed between the extending pieces 24$d$, 24$e$. That is, because the engaging projection 42 can be disengaged from the engaging groove 19 by rotating the check member 40 using a range between the extending pieces 24$d$, 24$e$ in the front-rear direction of the vehicle, the check member 40 can be downsized in the front-rear direction of the vehicle compared to a construction in which the check member 40 is configured to rotate avoiding an entire range of the driving shoe 21 in the front-rear direction of the vehicle.

According to the embodiment, when the stopping of the movement of the check member 40 in the rearward direction of the vehicle along the guide rail 14 is canceled, the engaging projection 42 is disengaged from the engaging groove 19 to enter into the third rail portion 17 while sliding the guiding surfaces 42$a$, 42$b$ on the engaging groove (inclined surfaces 19$a$, 19$c$) in the inclined direction. Thus, the engaging projection 42 is smoothly disengaged from the engaging groove 19. Accordingly, a noise generated, for example, by an interference of the engaging projection 42 with the guide rail 14 (third rail portion 17) when abruptly disengaging the engaging projection 42 from the engaging groove 19 is restrained.

According to the construction of the embodiment, by rotating the support bracket 27 between the first wall portions 24$a$, the support bracket 27 can be overlapped in a height range of the driving shoe 21, and particularly, the roof apparatus for the vehicle can be downsized in the height direction of the vehicle when the movable panel 13 is fully closed.

According to the construction of the embodiment, a positioning of the check member 40 relative to the support bracket 27 during the movable panel 13 is operated is determined by an engagement of the third guide pin 45 and the guiding slot 46.

According to the construction of the embodiment, because there is no need to use an additional member, for example, a spring, in order to maintain the fitting state of the engaging projection 42 relative to the engaging groove 19 or the third rail portion 17, influences of an aging degradation (secular change) is mitigated.

The constructions of the roof apparatus for the vehicle according to the embodiment may be changed as follows.

According to the embodiment, the check member 40 may be positioned at an inward of the driving shoe 21 (main body portion 24) in the vehicle width direction. In those circumstances, a restriction portion exclusive to the driving shoe 21 may be additionally provided.

According to the embodiment, the engaging projection 42 may be formed, for example, in an approximately cylindrical shape. The engaging groove 19 (guide block 18) may be integrally formed with the guide rail 14.

According to the embodiment, the disengagement of the engaging projection 42 from the engaging groove 19 may be restricted by supporting the check member 40 by the restriction portion provided exclusive to the driving shoe 21. In those circumstances, the restriction portion may be configured to support the check member 40 to restrict the disengagement of the engaging projection 42 from the engaging groove 19 in an entire section or a part of a section in which the tilting-up operation from the closed state of the movable panel 13 is performed. Alternatively, the restriction portion may be configured to support the check member 40 to restrict the disengagement of the engaging projection 42 from the engaging groove 19 in an entire section or a part of a section which includes at least a part of the section of the tilting-up operation from the closed state of the movable panel 13 until the movable panel 13 starts sliding via the tilting-up operation.

According to the embodiment, the interoperating connection of the driving shoe 21 and the support bracket 27, which moves upward and downward in response to the movement of the driving shoe 21 along the guide rail 14, is disclosed. Alternatively, for example, a lever which structures a link mechanism together with the support bracket 27 may be provided, and the support bracket 27 and the driving shoe 21 may be connected to interoperate via the lever.

According to the embodiment, the movable panel 13 may be operated to tilt-down in response to the movement of the driving shoe 21 in the rearward direction of the vehicle along the guide rail 14. Further, the movable panel 13 may maintain an attitude being parallel to the roof 10 during the sliding operation continuous from the tilting operation (i.e., tilting-up operation or tilting-down operation) of the movable panel 13.

According to the embodiment, the roof apparatus for the vehicle includes the driving shoe including the wall portions serving as a pair and arranged separately in the vehicle width direction, and the support member is positioned between the wall portions and is linked to the wall portions. According to the foregoing construction, by rotating the support bracket between the wall portions, the support bracket can be overlapped within a height range of the driving shoe, and the roof apparatus for the vehicle can be further downsized, particularly, when the movable panel is fully closed.

According to the embodiment, the cam recessed portion is formed to have a hole as the cam slot 43. However, the structure of the cam recessed portion is not limited to the penetrated construction, and the cam recessed portion may include a bottom.

According to the embodiment, the roof apparatus for the vehicle includes the driving shoe (21) provided at an edge portion in the vehicle width direction of an opening portion formed on the roof portion of the vehicle to be movable in the front-rear direction of the vehicle along the guide rail (14), the driven shoe (31) provided movably in the front-rear direction of the vehicle along the guide rail (14), the support member (27) rotatably connected to the driven shoe (31) and interoperating with the driving shoe (21) for supporting the movable panel (13) opening and closing the opening portion, the engaging groove (19) provided at the guide rail (14) and being in communication with an inside of the guide rail (14) at a rear portion thereof relative to the vehicle, the check member (40) rotatably connected to the driven shoe, the engaging projection (42) provided at the check member (40) for stopping the movement of the check member (40) in the rearward direction of the vehicle along the guide rail (14) by fitting into the engaging groove (19) and for canceling the stopping of the movement of the check member (40) in the rearward direction of the vehicle along the guide rail (14) by being disengaged from the engaging groove (19) and entering into the guide rail (14), the cam recessed portion (43) provided at the check member (40) for maintaining the fitting state of the engaging projection (42) relative to the engaging groove (19) until the movable panel (13) starts sliding by inserting the guide pin (44) provided at the driving shoe (21) thereto and for rotating the check member (40) to disengage the engaging projection (42) from the engaging groove (19) when the movable panel (13) starts sliding, and the restriction portion (24*e*) provided at the driving shoe (21) and supporting the check member (40) for restricting the disengagement of the engaging projection (42) from the engaging groove (19) during the tilting operation of the movable panel (13) from a closed state. The movable panel (13) is tilted from the closed state in response to the movement of the driving shoe in the rearward direction of the vehicle, and the sliding operation is performed consecutively.

According to the construction of the embodiment, the fitting state of the engaging projection (42) relative to the engaging groove (19) is maintained by the cam recessed portion (43) of the check member (40), to which the guide pin (44) of the driving shoe (21) is inserted, from the closed state of the movable panel (13) to the start of the sliding operation of the movable panel (13) via the tilting operation. The movement of the check member (40) in the rearward direction of the vehicle is stopped together with the driven shoe (31). Particularly, by restricting the disengagement of the engaging projection (42) from the engaging groove (19) by supporting the check member (40) by means of the restriction portion (24*e*), the movement of the check member (40) in the rearward direction of the vehicle together with the driven shoe (31) is further securely stopped to perform the more stabilized tilting operation of the movable panel (13). On the other hand, when starting the sliding operation of the movable panel (13) consecutive to the tilting operation, the rotation of the check member (40) is guided by the cam recessed portion (43) of the check member (40) to which the guide pin (44) of the driving shoe (21) is inserted so that the engaging projection portion (42) is disengaged from the engaging groove (19). Thus, the stopping of the movement of the check member (40) together with the driven shoe (31) is canceled so that the movable panel (13) is assumed to be slidable.

According to the embodiment, the driving shoe (21) includes the extending piece (24*e*) extending in the vehicle width direction. The extending piece (24*e*) is connected to the transmission member (25) movably driven by the drive source. The extending piece serves as the restriction portion (24*e*).

According to the construction of the embodiment, by applying the extending piece (24*e*) connecting the driving shoe (21) and the transmission member (25) as the restriction portion, the number of parts required is reduced.

According to the embodiment, the extending pieces (24*e*, 24*d*) are arranged as a pair in the front-rear direction of the vehicle. The check member (40) is allowed to rotate in a direction to disengage the engaging projection (42) from the engaging groove (19) in a clearance formed between the extending pieces arranged as the pair in the front-rear direction of the vehicle.

According to the construction of the embodiment, when the movable panel (13) starts sliding, the rotation of the check member (40) in a direction to disengage the engaging projection (42) from the engaging groove (19) is allowed within the clearance between the extending pieces (24*e*, 24*d*) provided in the front-rear direction of the vehicle. That is, because the engaging projection (42) is disengaged from the engaging groove (19) by rotating the check member (40) using the range between the extending pieces (24*e*, 24*d*) in the front-rear direction of the vehicle, the check member (40) can be downsized in the front-rear direction compared to a construction in which the check member (40) is configured to rotate avoiding an entire range of the driving 21 in the front-rear direction of the vehicle.

According to the embodiment, the engaging groove (19) inclines downwardly in the rearward direction of the vehicle to be in communication with the inside of the guide rail (14), and the engaging projection (42) includes a pair of guiding surfaces (42*a*, 42*b*) which are arranged in parallel to each other and are slidable with the engaging groove (19) in an inclined direction of the engaging groove (19).

According to the construction of the embodiment, when canceling the stopping of the movement of the check member (40) in the rearward direction of the vehicle along the guide rail (14), the engaging projection (42) is disengaged from the engaging groove (19) to enter into the guide rail (14) while sliding the guiding surfaces (42*a*, 42*b*) on the engaging groove (19) in the inclined direction. Thus, the engaging projection (42) is smoothly disengaged from the engaging groove (19). Accordingly, a noise generated, for example, by an interference of the engaging projection (42) with the guide rail (14) when abruptly disengaging the engaging projection (42) from the engaging groove (19) is restrained.

According to the embodiment, the driving shoe (21) includes two sets of the shoe portions (22, 23) and the main body portion (24), each of the sets includes a pair of the shoe portions (22, 23) arranged in the front-rear direction of the vehicle for sliding on a side of the guide rail (14) in the vehicle width direction and the main body portion connected to the shoe portions (22, 23), and the mentioned two sets of the shoe portions (22, 23) and the main body portion (24) are arranged facing in opposite directions and connected to one another.

According to the embodiment, one of the main body portions (24) positioned at an inner side of the guide rail (14) in the vehicle width direction includes the wall portion (24*a*) formed in a plate shape and provided in an upright manner above a center portion of the guide rail (14) in the vehicle width direction, and a pair of the extending pieces (24*b*, 24*c*) which extends from the bottom end of the wall portion inwardly in the vehicle width direction. The other of the main body portions (24) positioned at an outer side of the guide rail (14) in the vehicle width direction includes the wall portion (24*a*) formed in a plate shape and provided in an upright manner above a center portion of the guide rail (14) in the vehicle width direction, and a pair of the extending pieces (24*d*, 24*e*) which extends from the bottom end of the wall portion outwardly in the vehicle width direction.

According to the embodiment, the guide rail (14) includes the first rail portion (15) opening in an upward direction of the vehicle and the second rail portion (16) positioned adjacent to the first rail portion (15) at an outer side thereof in the vehicle width direction. The second rail portion (16) is in communication with the first rail portion (15) via the opening formed on the sidewall of the first rail portion.

According to the embodiment, the engaging projection (42) includes the upper surface (42*c*) and the bottom surface (42*d*) which are arranged in parallel to each other, connect the upper ends of the guiding surfaces (42*a*, 42*b*) each other, and connect the lower ends of the guiding surfaces (42*a*, 42*b*) each other.

According to the embodiment, the guide rail (14) includes the third rail portion (17) provided at a position which is outward of the first rail portion (15) in the vehicle width direction and upward of the second rail portion (16). The third rail portion (17) includes the cut-away portion (17*a*) which is formed on the upper wall of the third rail portion (17) at a predetermined position in the front-rear direction of the vehicle.

According to the embodiment, the cam recessed portion (43) includes the linear portion (43*a*) formed in a long hole shape extending in the front-rear direction of the vehicle, and the inclined portion (43*b*) continuously formed from the rear end of the linear portion (43*a*) and inclining upwardly towards the rear of the vehicle.

According to the embodiment, the roof apparatus for the vehicle which enhances reliability is provided by further stabilizing the tilting operation from the closed state of the movable panel.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A roof apparatus for a vehicle, comprising:

a driving shoe provided at an edge portion in a vehicle width direction of an opening portion formed on a roof portion of the vehicle to be movable in a front-rear direction of the vehicle along a guide rail;

a driven shoe provided movably in the front-rear direction of the vehicle along the guide rail;

a support member rotatably connected to the driven shoe and interoperating with the driving shoe for supporting a movable panel opening and closing the opening portion;

an engaging groove provided at the guide rail and being in communication with an inside of the guide rail at a rear portion of the guide rail relative to the vehicle;

a check member rotatably connected to the driven shoe;

an engaging projection provided at the check member for stopping a movement of the check member in the rearward direction of the vehicle along the guide rail by fitting into the engaging groove and for canceling the stopping of the movement of the check member in the rearward direction of the vehicle along the guide rail by being disengaged from the engaging groove and entering into the guide rail;

a cam recessed portion provided at the check member for maintaining the fitting state of the engaging projection relative to the engaging groove until the movable panel starts sliding by inserting a guide pin provided at the driving shoe thereto and for rotating the check member to disengage the engaging projection from the engaging groove when the movable panel starts sliding;

a restriction portion provided at the driving shoe and supporting the check member for restricting the disengagement of the engaging projection from the engaging groove during a tilting operation of the movable panel from a closed state; wherein the movable panel is tilted from the closed state in response to a movement of the driving shoe in the rearward direction of the vehicle, and a sliding operation is performed consecutively.

2. The roof apparatus for the vehicle according to claim 1, wherein the driving shoe includes an extending piece extending in the vehicle width direction, the extending piece being connected to a transmission member movably driven by a drive source; and wherein the extending piece serves as the restriction portion.

3. The roof apparatus for the vehicle according to claim 2, wherein the extending pieces are arranged as a pair in the front-rear direction of the vehicle; and wherein the check member is allowed to rotate in a direction to disengage the engaging projection from the engaging groove in a clearance between the extending pieces arranged as said pair in the front-rear direction of the vehicle.

4. The roof apparatus for the vehicle according to claim 1, wherein the engaging groove inclines downwardly in the rearward direction of the vehicle to be in communication with the inside of the guide rail; and the engaging projection includes a pair of guiding surfaces which are arranged in parallel to each other and are slidable with the engaging groove in an inclined direction of the engaging groove.

5. The roof apparatus for the vehicle according to claim 1, wherein the driving shoe includes two sets of shoe portions and a main body portion, each of the sets includes a pair of the shoe portions arranged in the front-rear direction of the vehicle for sliding on a side of the guide rail in the vehicle width direction and the main body portion connected to the shoe portions, and said two sets of the shoe portions and the main body portion are arranged facing in opposite directions and connected to one another.

6. The roof apparatus for the vehicle according to claim 5, wherein one of the main body portions positioned at an inner side of the guide rail in the vehicle width direction includes a wall portion formed in a plate shape and provided in an upright manner above a center portion of the guide rail in the vehicle width direction, and a pair of extending pieces which extends from a bottom end of the wall portion inwardly in the vehicle width direction; and the other of the main body portions positioned at an outer side of the guide rail in the vehicle width direction includes a wall portion formed in a plate shape and provided in an upright manner above a center portion of the guide rail in the vehicle width direction, and a pair of extending pieces which extends from a bottom end of the wall portion outwardly in the vehicle width direction.

7. The roof apparatus for the vehicle according to claim 6, wherein the guide rail includes a first rail portion opening in an upward direction of the vehicle and a second rail portion positioned adjacent to the first rail portion at an outer side thereof in the vehicle width direction; and wherein the second rail portion is in communication with the first rail portion via an opening formed on a sidewall of the first rail portion.

8. The roof apparatus for the vehicle according to claim 4, wherein the engaging projection includes an upper surface and a bottom surface which are arranged in parallel to each other, connect upper ends of the guiding surfaces each other, and connect lower ends of the guiding surfaces each other.

9. The roof apparatus for the vehicle according to claim 7, wherein the guide rail includes a third rail portion provided at a position which is outward of the first rail portion in the vehicle width direction and upward of the second rail portion; and wherein the third rail portion includes a cut-away portion which is formed on an upper wall of the third rail portion at a predetermined position in the front-rear direction of the vehicle.

10. The roof apparatus for the vehicle according to claim 1, wherein the cam recessed portion includes a linear portion formed in a long hole shape extending in the front-rear direction of the vehicle, and an inclined portion continuously formed from a rear end of the linear portion and inclining upwardly towards a rear of the vehicle.

* * * * *